US011903410B1

(12) United States Patent
VanVoorhees

(10) Patent No.: US 11,903,410 B1
(45) Date of Patent: Feb. 20, 2024

(54) SMOKABLE CANNABIS POD AND METHOD AND APPARATUS FOR MAKING THE SAME

(71) Applicant: Clifford VanVoorhees, Littleton, CO (US)

(72) Inventor: Clifford VanVoorhees, Littleton, CO (US)

( * ) Notice: Subject to any disclaimer, the term of this patent is extended or adjusted under 35 U.S.C. 154(b) by 987 days.

(21) Appl. No.: 16/507,376

(22) Filed: Jul. 10, 2019

Related U.S. Application Data

(63) Continuation-in-part of application No. 29/598,812, filed on Mar. 29, 2017, now abandoned.

(60) Provisional application No. 62/750,249, filed on Oct. 24, 2018.

(51) Int. Cl.
*A24D 1/18* (2006.01)
*A24B 15/167* (2020.01)
*B30B 11/04* (2006.01)

(52) U.S. Cl.
CPC .............. *A24D 1/18* (2013.01); *A24B 15/167* (2016.11); *B30B 11/04* (2013.01)

(58) Field of Classification Search
CPC ............ A24B 15/167; A24D 1/18; A24F 5/10
See application file for complete search history.

(56) References Cited

U.S. PATENT DOCUMENTS 4,944,317 A * 7/1990 Thal ......................... A24D 1/14 131/348
10,646,881 B1 * 5/2020 Page ....................... B02C 19/18
2018/0154103 A1 * 6/2018 Davis ................... A61M 11/041

FOREIGN PATENT DOCUMENTS

CA 3074867 A1 * 4/2019 ........... A24B 15/241
WO WO-2009068279 A1 * 6/2009 ............... A23G 3/48

* cited by examiner

*Primary Examiner* — Cynthia Szewczyk
(74) *Attorney, Agent, or Firm* — Colorado Patents; Brian D Smith

(57) ABSTRACT

A smokable cannabis product and method for making the same are disclosed. The method includes providing a batch of cannabis containing cannabis flowers, stems, leaves and seeds and then grinding it. Then, the stems, leaves and seeds are removed from the ground batch so that it primarily contains ground cannabis flowers. The batch is then compressed to form a plurality of compressed cannabis pods having a desired shape for being smoked in a complementarily shaped bowl of a smoking device. The compressed pods are then dried to harden them so that they maintain their desired shape and so that each pod has a porosity which allows air to flow through the pod as it is smoked in the smoking device's bowl.

21 Claims, 4 Drawing Sheets

SMOKABLE CANNABIS POD AND METHOD AND APPARATUS FOR MAKING THE SAME

CROSS REFERENCE TO RELATED APPLICATION

This application is a nonprovisional application claiming the benefit under 35 U.S.C. 119(e) of U.S. provisional application no. 62/750,249 filed on Oct. 24, 2018 and a continuation-in-part of U.S. design patent application Ser. No. 29/598,812 filed on Mar. 29, 2017.

Technical Field of the Invention

The present invention relates generally to products made from cannabis and, more particularly, to methods and apparatus for making smokable cannabis products.

BACKGROUND OF THE INVENTION

A need for better and more enjoyable ways to smoke cannabis (marijuana) is being driven by the increased legalization of the drug/plant across the United States. While cannabis is often smoked as a cigarette many prefer to smoke it in a pipe or other smoking device having a bowl for containing the cannabis such as a vaporizer. These bowl type smoking devices primarily referred to herein as pipes offer several advantages not the least of which is the fact that the cannabis does not have to be rolled into a cigarette with paper. Cigarettes (or joints as they are also called) can also be difficult to hold particularly when attempting to smoke the last bit or end of a joint. In addition, smokers have been known to burn their lips when smoking the burning end of a joint.

The foregoing drawbacks associated with smoking cannabis cigarettes are avoided when smoking cannabis with a pipe. However, pipe smoking also has its drawbacks. For example, cannabis is often spilled by the smoker as he or she attempts to fill the pipe's bowl with cannabis. It is also sometimes difficult to load the cannabis into the bowl with a consistency or porosity that allows air to easily flow through the cannabis in the bowl as its being smoked. Some smokers pack or tamp the cannabis in the bowl too tightly with makes it difficult to draw air through the packed cannabis in the bowl. Accordingly, what is needed is a pipe smokable cannabis product that is porous enough to permit air flow through the product so the product will burn easily in a pipe bowl as well as a size which fits the bowl making it easy to load the bowl and smoke the product.

SUMMARY OF THE INVENTION

In attempting to devise a pipe smokable cannabis product which can be sized to fit the bowl of a pipe (or other bowl type smoking device) and have a good porosity for smoking it was discovered that cannabis is naturally sticky when hydrated or fresh which allows it to be formed into a product that can be shaped to fit the bowl of a pipe or other smoking device. This natural stickiness is attributable to small resin sacks called trichomes which grow on the surface of the cannabis plant and over its flower. These small sacks, which are also called crystals or hairs, are naturally sticky and contain special molecules including terpenes and cannabinoids. They are visible to the eye upon close inspection and cover most of the plant. When hydrated or fresh the crystals become sticky. If a person pinches the flower with their fingers a sticky residue will be left on their fingers.

In making the cannabis product of the present invention, properly hydrated or fresh cannabis is compressed which releases resin from the cannabis' trichome resin sacks which acts as a natural adhesive causing the cannabis particles to adhere to each other and maintain the compressed cannabis product's shape. This is a major feature in the success of the product of the present invention. Other smokable products in the literature teach the adding of binding agents or added ingredients to maintain the shape of a product. However, in the method of the present invention nothing needs to be added since as indicated the stickiness of the trichrome resin acts as a natural adhesive for maintaining the product's desired shape which typically is a shape that is sized to fit the bowl of a pipe.

The method of the present invention for making a pipe smokable cannabis product includes the following steps which begins with the step of providing a batch of cannabis containing cannabis flowers, stems, leaves and seeds. The cannabis is then ground to detach the cannabis flowers from the stems, leaves and seeds and then the stems, leaves and seeds are removed from the ground cannabis now containing ground cannabis flowers. After removing the stems, leaves and seeds, the batch of cannabis containing the ground cannabis flowers is inspected to determine whether the cannabis is fresh which is done by examining the flowers to see if they are soft (or moist) enough to be capable of being compressed without falling apart. If the flowers are not fresh and are too dry and crumbly, the flowers are then hydrated until their relative humidity (RH) is greater than or about equal to 60% RH but less than 80% RH. The hydrated cannabis batch (or fresh cannabis if hydrating is not necessary) is then compressed to form a plurality of compressed cannabis pods having a desired shape for being smoked in the bowl of a pipe. In a preferred embodiment, the step of compressing is carried out with a compression system including a compression machine and forming trays, one of which (a filling tray) is configured with a grid of pockets which are shaped to provide the cannabis pods with the desired shape. In any event, after the compressed pods are formed they are then dried (preferably while still in the filling tray) to harden them so that they maintain their desired shape (when they are removed from the filling tray) and so that each pod has a porosity which allows air to flow through the pod as it is being smoked in the bowl of a pipe having a shape which facilitates air flow through the pod.

An alternative method of the present invention further includes a step of adding ingredients to the batch of cannabis prior to hydrating the batch and preferably after removing the stems, leaves and seeds from the batch. The added ingredients can include a variety of substances such as concentrated oil and concentrated trichomes and they would be added by mixing the added ingredient into the batch until homogenization is achieved, i.e. until the ingredient is distributed evenly throughout the cannabis batch. The batch with the added ingredient would then be hydrated (if necessary) and processed by carrying out the remaining steps of the process as described above and in the detailed section below.

In a second alternative method of the present invention added ingredients can be added immediately prior to removing the pods from the filling tray. The ingredients such as concentrated oil and concentrated trichomes (kief) would be added like a topping to the top surface of the pods as they lie in the filling tray. Concentrated oil would typically be dripped or sprayed onto the pod. Concentrated trichomes (kief) would preferably be sprinkled over the pods. The pods would then preferably be compressed again in the forming trays and compression machine to compress or push the concentrated oil and trichomes (kief) into the pods. The remaining steps of the process as described above and in the detailed section below would then be carried out to produce the pods of the present invention.

While the ingredients which may be added have generally been described as concentrated oil and trichomes those skilled in the art will appreciate that these items are known colloquially by other terms such as Kief for concentrated trichomes and Distillate for concentrated oil. Concentrated oil typically consists of the cannabinoids found in the cannabis plant which can include THC, CBD and a long list of other compounds including CBN, CBG, THCV. Another concentrated oil which may be added is terpene oil which typically comprises compounds associated with the flavor and smell of plants in general. Famous terpenes include limonene, pinene, myrcene and much more. Other essentially synonymous names in the industry for concentrated cannabinoid oils include: cannabis extracts, cannabis concentrates, concentrate cannabinoid oil, shatter and wax.

In addition to the unique and novel method described herein, the present invention provides a smokable cannabis pod which is preferably produced by the method of the present invention. The pod has a desired shape and porosity which allows air to flow through the pod as it is smoked in the bowl of a pipe (or other smoking device) having a shape which facilitates air flow through the pod.

Additional advantages of this invention will become apparent from the description which follows, taken in conjunction with the accompanying drawings.

DETAILED DESCRIPTION OF PREFERRED EMBODIMENT

Figure 1:
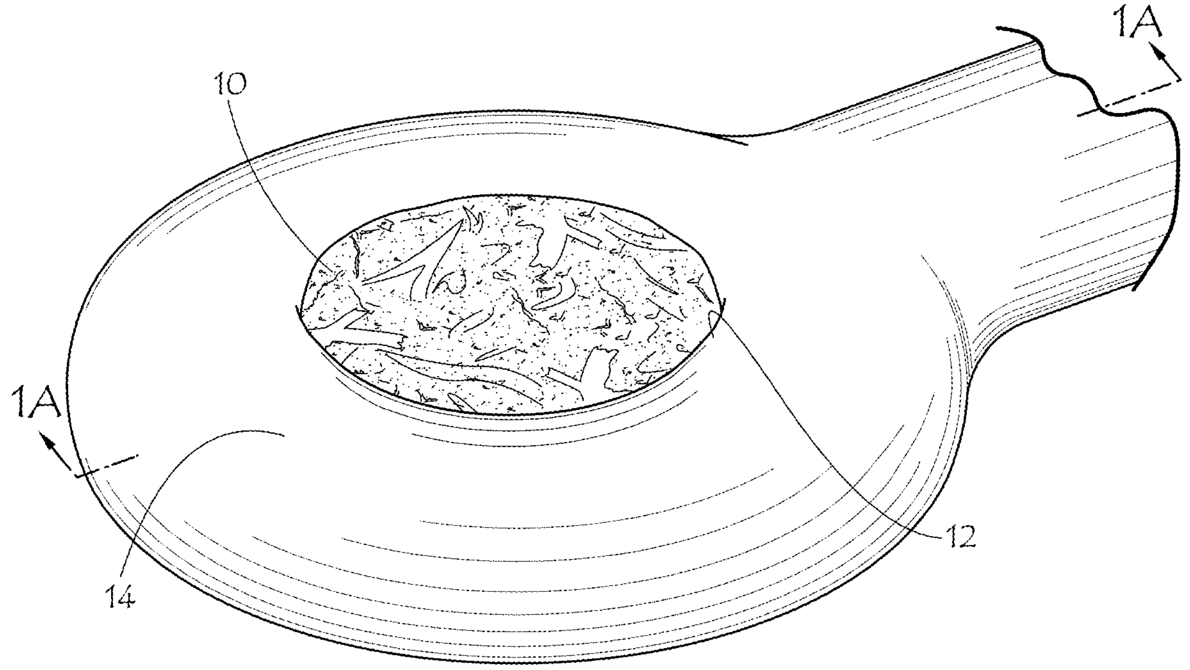
FIG. 1 is a perspective view of a pipe bowl containing a cannabis product of the present invention referred to herein as a cannabis pod.
Figure 1A:
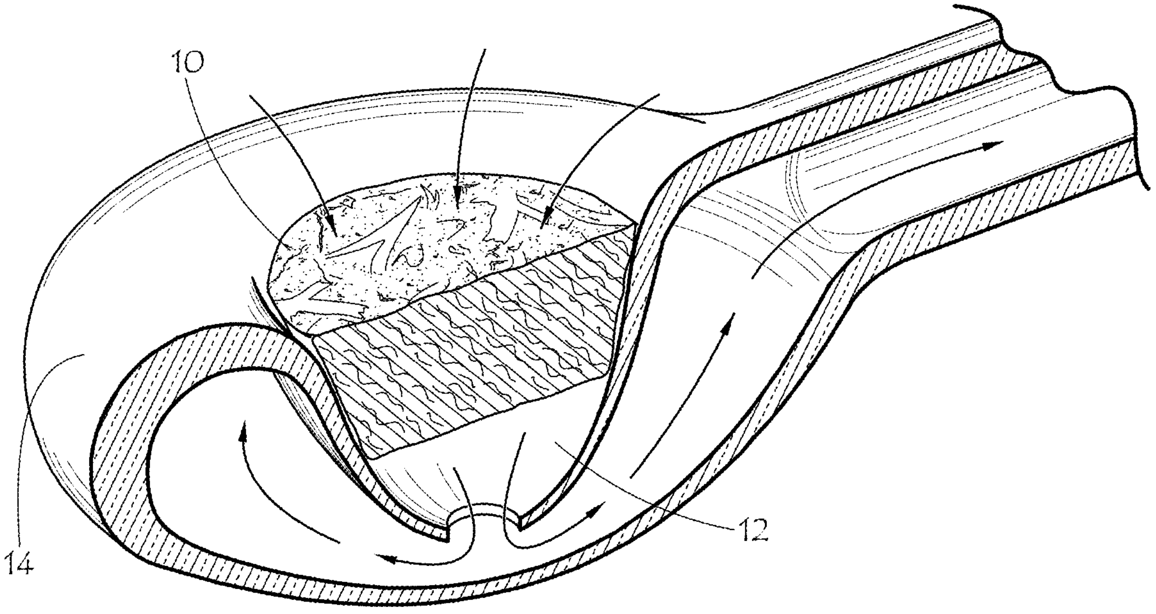
FIG. 1A (SECTION 1A) is a cross-sectional view of the pipe bowl and cannabis pod of FIG. 1.
Figure 1B:
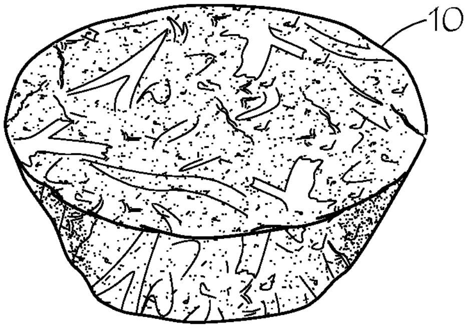
FIG. 1B is a perspective view of the cannabis pod of FIG. 1 showing the pod in isolation which is also a perspective view of my new, original and ornamental design for a Ground & Compressed Herbal Product for Smoking and Vaporizing.
Figure 2:
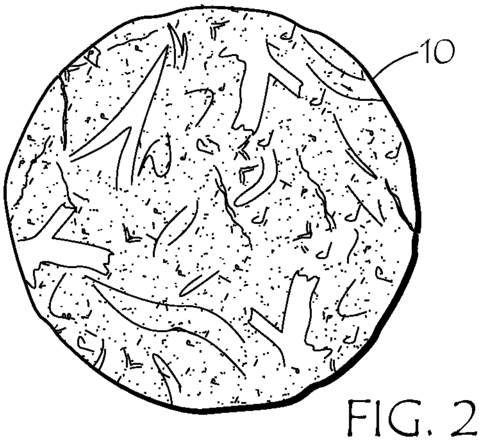
FIG. 2 is a top plan view of the Ground & Compressed Herbal Product for Smoking and Vaporizing of FIG. 1B.
Figure 3:
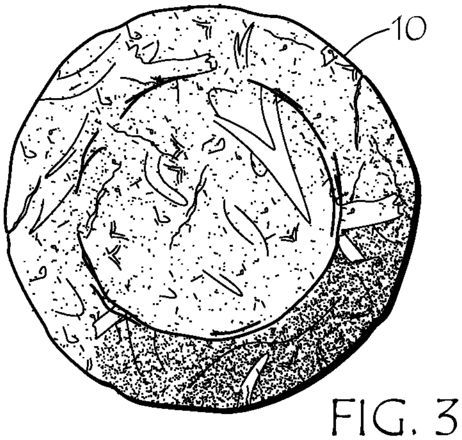
FIG. 3 is a bottom plan view of the Ground & Compressed Herbal Product for Smoking and Vaporizing of FIG. 2; and, FIG. 4 is a side elevational view of the Ground & Compressed Herbal Product for Smoking and Vaporizing of FIG. 2 wherein all side elevational views are the same in appearance and for which I claim the ornamental design for a Ground & Compressed Herbal Product for Smoking and Vaporizing, as shown and described in FIGS. 1B and 2-4.
Figure 4:

FIGS. 1 and 1A illustrate a preferred cannabis pod 10 of the present invention placed in a bowl 12 of a pipe 14 which is used to smoke pod 10. Pod 10 is preferably made by carrying out the steps of the method of the present invention as set forth in the following description of the invention. FIGS. 2-4 show other views of pod 10 of the present invention.

Selecting Cannabis Having Buds, Popcorn Buds or Shake

Any cannabis also referred to as cannabis strain can be used to make pod 10 of the present invention. Scientifically cannabis strains are typically grouped as indica, sativa or a genetic hybrid of both. Hundreds of strains exist with informal names including Blue Dream, Golden Goat, Sour Diesel, Durbin Poison, etc. While pod 10 can be made using any strain of cannabis, cannabis that has a higher percentage of buds, popcorn buds (cannabis that is in small pieces), or shake (cannabis that is lightly ground up) is preferred because it results in the production of a pod having a porosity that can be smoked easily in the bowl of a pipe. Cannabis that is too finely ground like a powder should be avoided. Such small particles are undesirable since they are too small to overlap and adhere to each other and as such will not produce pods which can remain intact. They would fall apart too easily when being handled or during packaging. Conversely, if the cannabis particles are too large then air will not flow through the pod as indicated by the arrows in FIG. 1A which is undesirable because the pod will not burn evenly (if it burns at all) when it is smoked in the bowl of the pipe. The pod may still burn because air may flow around the pod in the bowl of the pipe causing the outer surface of the pod to burn but it will not burn evenly across and through the pod.

Grinding the Dried Cannabis

After selecting (or providing) a desired strain of cannabis as discussed above, a batch of the selected cannabis to be processed in accordance with the method of the present invention is then ground. A preferred grinding device for grinding the selected cannabis is a Model # APZS-14 made by Winco of La Mirada, CA. In accordance with the method of the present invention, the selected cannabis is lightly ground so that its flower detaches from the stems, leaves and seeds of the cannabis. The mean particle size of the ground primarily flower cannabis should be around 5 mm in diameter. However, even with a mean size around 5 mm, the particles in a batch of ground cannabis having a 5 mm diameter mean size would range in size from about 0.1 mm in diameter to about 10 mm in diameter since some of the particles will be larger while some will be smaller dust-like particles which is acceptable as long as the percentage of dust-like particles is small. Also, it is believed that larger pods for use in larger bowls could tolerate even larger mean particle sizes, e.g. up to about 10 mm in diameter.

Removing the Detached Unwanted Material

In any event, after the grinding the batch of selected cannabis, the unwanted material including leaves, stems and seeds is separated and removed from the desired ground flower particles and discarded. As mentioned, small amounts of unwanted material typically fines can be tolerated. The remaining cannabis is then weighed and the weight is recorded. This information is helpful in determining how many pods of cannabis can be produced from the batch.

Hydrating the Cannabis

After carrying out the previous steps, if the cannabis in the batch of remaining cannabis appears to be dry and has flowers which are crumbly, the cannabis should be hydrated to make it softer and more bendable. There are several ways to hydrate or re-hydrate plant material that has been previously harvested and dried. A humidor may be used which is also often used by cigar smokers to hydrate the tobacco of a cigar. Or, a bowl containing room temperature water may be used which can be placed next to the cannabis inside a sealed container. In addition, a hydrating packet having a pre-set RH (relative humidity) control may be used such as a Boveda 2-Way Humidity Control Pack made by Boveda Inc. of Minnetonka, MN. The packet is placed in an airtight container with the cannabis and left there until the desired humidity level is achieved. Lastly, there are electric humidifying devices which may be used. These devices use a small reservoir of water and a fan to emit water vapor into the air. A sensor turns off the fan when the desired RH level is achieved. All of these methods achieve the same goal which is to increase the RH level with water vapor of a given container which ends up softening and hydrating the plant material inside the container. Any method is acceptable for use in this application. The desired RH level for all methods is at or above 60% RH. Each method requires about 24 hours of hydration with a constant 60%+ RH reading. It needs to be noted that an RH at or above 80% is undesirable in that it can lead to mold and soften the plant material too much to the point where it has an almost mushy consistency. Whatever method is used, after about 24 hours the moisture level in the cannabis should be tested. When it is ready, i.e. properly hydrated, it will be soft and bendable throughout the cannabis, not just on its outside surface. To test, a small quantity, around 1 gram, of the hydrated cannabis should be pinched with one's fingers. If the cannabis is soft and remains intact (i.e. stays together without falling apart) then it is ready to be compressed into a desired shape which as shown in the embodiment of FIGS. 1-4 is a frustoconical shape. While as indicated, it is desirable to hydrate the cannabis if it is dry, it has been found that fresh cannabis often contains enough moisture to skip the hydrating step. Fresh cannabis is cannabis that has been recently harvested, cured and/or stored in airtight containers and contains enough moisture to have an RH level between 60 and 80.

Compressing the Cannabis into its Final Pod Shape

Figure 5:
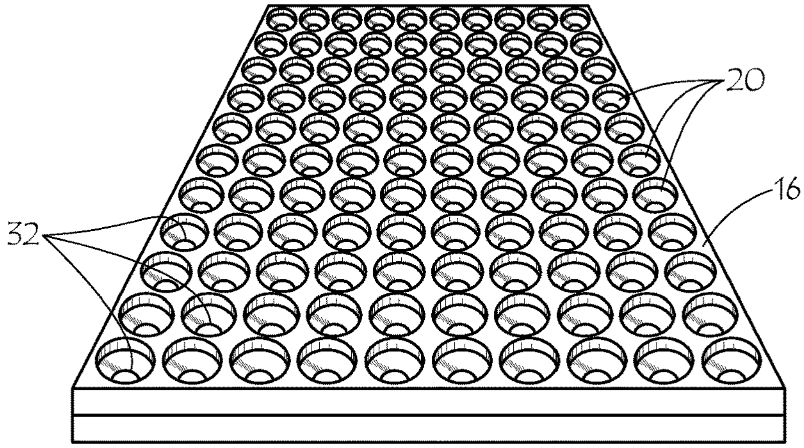
FIG. 5 is a perspective view of a filling tray used in forming a plurality of cannabis pods, i.e. the Ground & Compressed Herbal Products for Smoking and Vaporizing of the present invention.
Figure 6:
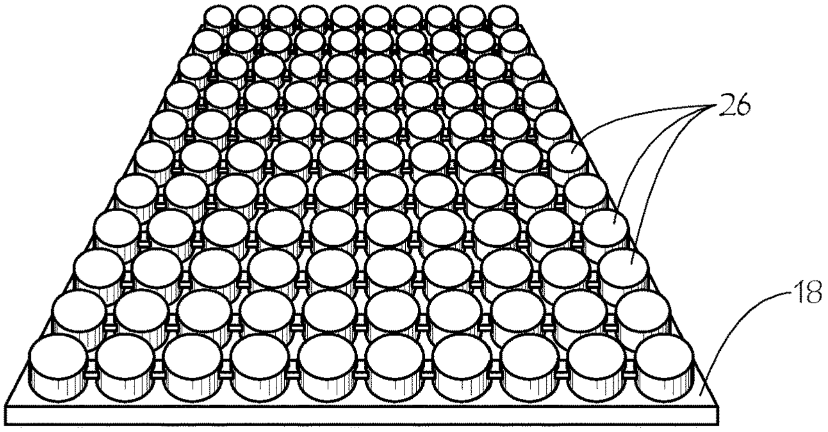
FIG. 6 is a perspective view of a compressor tray used in forming a plurality of cannabis pods of the present invention.

After carrying out the foregoing steps, the batch of remaining hydrated or fresh cannabis is compressed using special forming trays 16 and 18 as shown in FIGS. 5 and 6 and a compression machine (not shown) which transforms the cannabis into the pods of the present invention. A compression machine which is suitable for use in the method of the present invention is made by US Cutter of Redmond, WA, Model No. FHLP3805B. This machine provides constant and even downward pressure on the trays.

Figure 8:
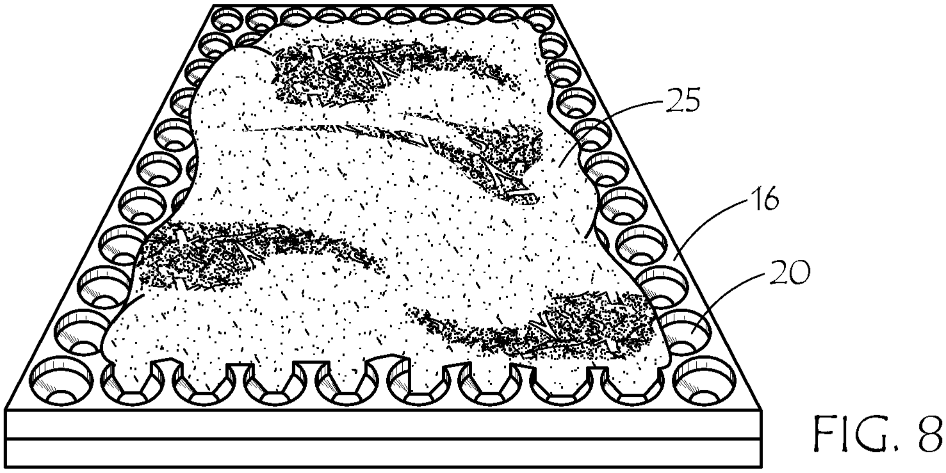
FIG. 8 is a perspective view showing the filling tray of FIG. 5 partially covered with a batch of cannabis which is formed into the cannabis pods of the present invention in accordance with the method of the present invention.
Figure 7:
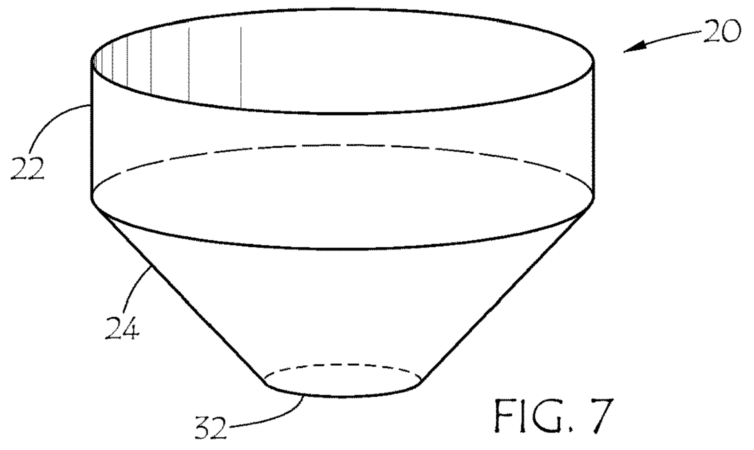
FIG. 7 is a perspective schematic view of a pocket of the filling tray of FIG. 5.
Figure 9:
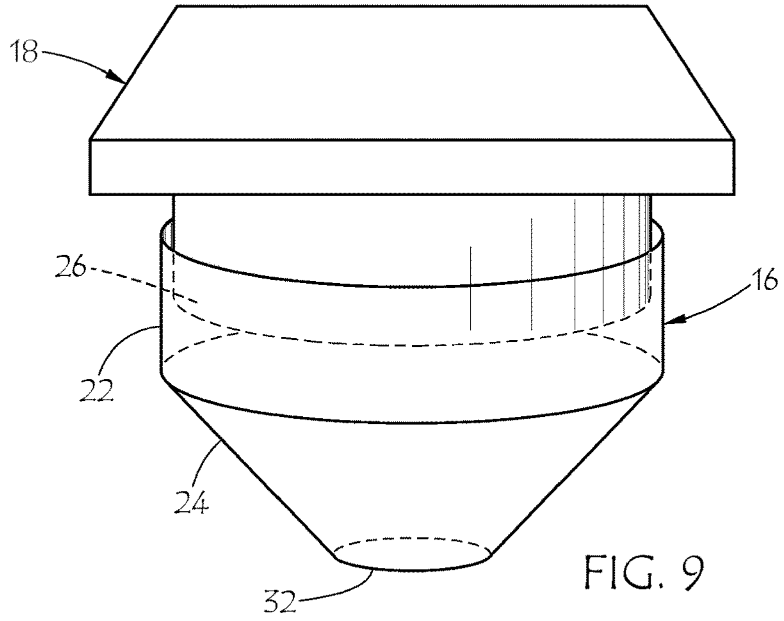
FIG. 9 is a perspective schematic view showing a compressing member of the compressor tray of FIG. 6 partially inserted into the pocket of the filling tray of FIG. 5.
Figure 10:
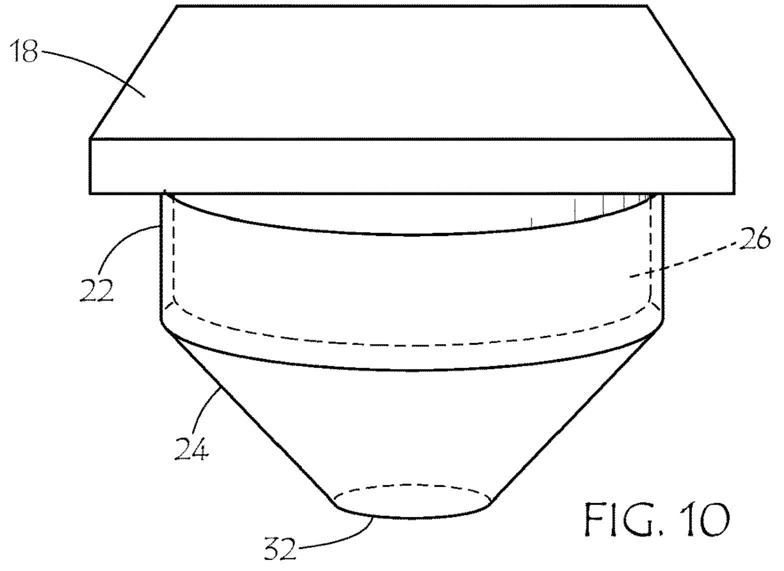
FIG. 10 is a perspective schematic view similar to that of FIG. 9 but different in that it shows the compressing member fully inserted into the pocket of the filling tray; and, FIG. 11 is a perspective view of an ejector tray used in ejecting a plurality of cannabis pods of the present invention from the filling tray of FIG. 5.

1. The compression step begins with filling tray 16. As shown, tray 16 is a generally flat tray which is configured with a grid of pockets 20. As best shown in the schematic view of FIG. 7, each pocket 20 has a cylindrical top portion 22 that when filled contains the correct amount of cannabis for forming a pod 10. Each pocket 20 as also shown has a truncated cone-shaped (frustoconical) bottom portion, actually a die 24, which is located directly below the cylindrical top portion 22. As will be appreciated, the pods take the form of the truncated cone-shaped bottom portion or die 24 during the compression process. While die 24 has a truncated cone shape other shapes and sizes may also be utilized in accordance with the present invention, the shape of which ultimately depends upon the shape of the bowl in which the pod is to be smoked. At the current time, other pod shapes being considered include cone, brick, parabolic and cylinder shapes. Thus, the shape and size of the pod can change but the function will still be the same.
2. Next, as shown in FIG. 8, the batch 25 of remaining hydrated or fresh cannabis is spread out onto filling tray 16. Each pocket 20 is either manually or mechanically filled with equal amounts of cannabis. A person can achieve this manually by visual inspection and by putting their finger into the pockets in order to judge how packed each pocket is. If any pocket is not filled or packed enough then excess material from other pockets can be taken to fill each pocket. If there is not enough cannabis in the batch to fill all of the pockets on tray 16 the unfilled pockets can be left empty or they can be filled with hydrated or fresh cannabis from another batch. A mechanical method for insuring that each pocket is filled equally could include a vibrating device that would shake the tray and the cannabis causing the cannabis to fill each pocket equally.
3. In any event, after filling the pockets of the filling tray to the extent possible, the compression tray 18 is then aligned with filling tray 16 so that the compressing members 26 of the compressor tray are partially inserted into the pockets of the filling tray as shown schematically in FIG. 9. The aligned trays are then placed into the compression machine (not shown) which has a plate that pushes the compressor tray until it is fully inserted into the filling tray as shown schematically in FIG. 10. The compression machine is then locked by moving a handle (not shown) on the machine to a locked position which locks the trays together.
4. In the preferred embodiment, the trays are locked together for at least an hour which is typically enough time to cause the cannabis to conform to the shape of the filling tray dies 24 which provides the formed pods with their final desired shape. Then, the compression machine is unlocked and the trays are removed from the machine and the compressor tray 18 is removed from the filling tray 16.

Drying the Cannabis in the Dies of the Filling Tray

After removing the compressor tray from the filling tray, the cannabis is allowed to dry for about 24 hours while still in dies 24 of filling tray 16. This helps harden each cannabis pod so that it will maintain its shape, i.e. its final pod shape, when it is removed from the filling tray. As indicated, about 24 hours of drying at room temperature is needed to fully dry the cannabis. However, if drying equipment such as a vacuum, fan or dehumidifier is employed it is believed that the drying time can be reduced to 1-3 hours.

In addition to hardening and having the desired final pod shape (which is the shape of the filling tray die) the dried cannabis pods should also have a density or porosity which allows air to flow through the pod so that the pod will burn evenly as it is smoked in the bowl of a pipe. To insure proper density and pod shape it is important to not remove the pods from their dies 24 (of the filling tray) while they are still wet (humidified) as this will cause the plant material of the pods to expand and deform as its dries and eventually fall apart. As indicated, one of the advantages of the method of the present invention is that it not only provides the pod with the desired shaped but also a porosity which enables air to flow through the pod as the pod is smoked in the bowl of a pipe. Correct or proper porosity is achieved by not packing and compressing the cannabis in dies 24 too tightly and by drying the cannabis in the filling tray which leaves small cavities in the pods which are created when the water/moisture in the pods evaporates during the drying process. These cavities provide unique smooth burning of the pod when it is smoked since air flows through these cavities as the pod is smoked instead of flowing around the pod, i.e. around the outer surface of the pod.

In addition, correct or proper pod porosity is achieved by sizing and configuring pockets 20 to cooperate with said compressing members 26 of the compressor tray so that when the pockets are filled with hydrated or fresh cannabis and then compressed the subsequently dried pods will have the above discussed correct porosity. In the illustrated embodiment, the foregoing is facilitated by providing the cylindrical top portion 22 of each pocket 20 with a size so that when it is filled with cannabis and then compressed all of the cannabis in top portion 22 is compacted into the lower die portion 24 to form pod 10 and provide it with the above discussed correct porosity and density which allows air to flow through the pod as it is smoked in the bowl of a pipe, i.e. when the bowl of the pipe has a shape which facilitates air flow through the pod. In the illustrated embodiment both pipe bowl 12 and pod 10 as shown in FIG. 1A have complementary frustoconical shapes which facilitates air flow through the pod but not around the pod.

Additionally, the method of the invention leverages the natural adhesive properties of the cannabis plant (known as trichomes) which is a natural sticky substance in cannabis that enables the pods to maintain their shape (and remain intact) while still allowing for correct pod porosity. This method is different from pelleting/pelletizing and other similar methods currently used to pelletize cannabis which produce pellets that are too dense to permit air flow through the pellets as they are smoked. Also, pellets are not currently shaped or designed to be smoked in a smoking device as their primary function. In addition, pellets are not currently shaped to compliment the shape of the bowl of a smoking device and, along with being too dense, are not capable of being smoked properly.

Other methods like compaction and briquetting use extreme pressure to bond the particles which also produces a product which is too dense to be smoked in a pipe. These dense products have no detectable porosity and must be broken up or crumbled before they can be smoked.

Ejecting Final Product (Pods) from the Filling Tray

Figure 11:
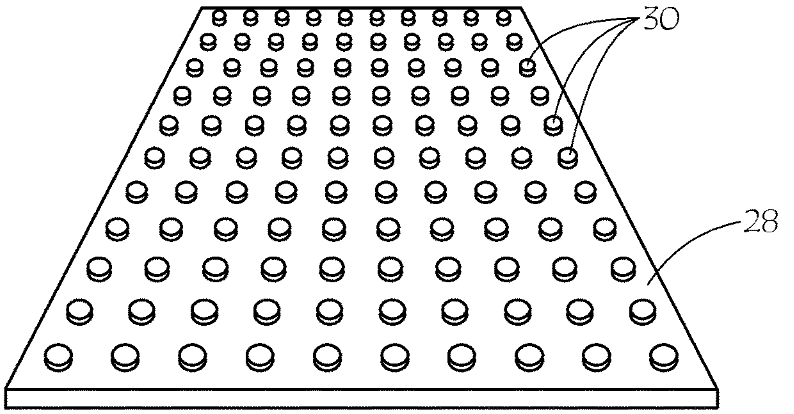

After drying the cannabis pods in the filling tray's dies 24, as discussed above, the pods are ejected from the filling tray 16 with ejector tray 28 shown in FIG. 11. This step is performed by turning the filling tray upside down onto a plate or other generally flat surface. The ejector tray 28 is then aligned with filling tray 16 so that the pins 30 of the ejector tray align with holes 32 provided in the bottom of each die 24 of the filling tray. The ejector tray is then pressed against the filling tray which causes the ejector pins to force the pods out of the pockets of the filling tray which literally pop right out of the filling tray. If any pods happen to remain in the filling tray they can be removed quite easily by using a pointed device (not shown) to eject them.

After ejecting the pods from the filling tray, the filling tray is removed from the work area to facilitate a quality control inspection of the ejected pods in which three aspects of the pods are evaluated. First, the pods are visually inspected to insure that all of them have the same shape (actually close to the same shape) which as illustrated in this embodiment is a truncated cone (frustoconical).

Second, the pods are checked by smoking a pod from the batch to determine if it has adequate porosity which as used herein is enough porosity to permit air to flow through the pod as shown in FIG. 1A (i.e. not around the pod) so that the pod burns evenly across and through the pod when it is smoked (i.e. in the bowl of a pipe having a shape which complements that of the pod). As shown in FIG. 1A and previously discussed, bowl 12 of pipe 14 has a frustoconical shape which complements the frustoconical shape of pod 10.

Lastly, pod durability is tested to make sure it remains intact and does not fall apart easily. Currently, the pod is dropped from a 4 foot counter onto a hard floor three times. If the pod maintains its shape and does not fall apart (or break up) it passes the durability test. Other durability tests can be administered such as using a machine to apply force to the pod and then measuring at what force the pod falls apart or breaks up.

There is no need to conduct the durability test or the smoking test on all of the pods produced in a batch. It has been found that most if not all pods in a batch will pass the durability and smoke tests if one or at most a few of pods pass.

This invention has been described in detail with reference to particular embodiments thereof, but it will be understood that various other modifications can be effected within the spirit and scope of the invention.

I claim:

1. A method of making a smokable cannabis product comprising the steps of:

providing a batch of cannabis containing cannabis flowers, stems, leaves and seeds;

grinding the cannabis to detach cannabis flowers from the stems, leaves and seeds;

removing the stems, leaves and seeds from the detached ground cannabis flowers;

after removing the stems, leaves and seeds, inspecting the cannabis batch containing the detached ground cannabis flowers to determine whether the flowers are moist enough, that is, contain sufficient water, to be capable of being mechanically compressed without falling apart;

mechanically compressing a said cannabis batch having said moist enough cannabis flowers to form a plurality of mechanically compressed cannabis pods having a desired shape for being smoked in the bowl of a smoking device and a porosity which allows air to flow through the pod when the pod is subsequently dried so that the pod burns evenly across and through the pod when it is smoked in the bowl of the smoking device having a shape which facilitates air flow through the pod; and, drying the compressed pods to harden the cannabis so that the pods maintain the desired shape and have the said porosity.

2. A method as claimed in claim 1 wherein the pod has a frustoconical shape for being smoked in a complementary frustoconically shaped bowl of a smoking device.

3. A method as claimed in claim 1 wherein each dried compressed pod is capable of maintaining its desired shape after being dropped onto a hard surface from a height of at least 4 feet.

4. A method as claimed in claim 1 wherein the step of mechanically compressing is carried out with a compression system including forming trays and a compression machine.

5. A method as claimed in claim 4 wherein the forming trays include a filling tray configured with a grid of pockets for receiving the ground cannabis flowers and wherein said pockets are shaped to provide the cannabis pods with the desired shape.

6. A method as claimed in claim 5 wherein the forming trays further include a compressor tray configured with a grid of compressing members which are configured to be inserted into the filling tray's pockets after the pockets are filled with ground cannabis flowers and wherein said method further includes:

filling the said pockets of said filling tray with said ground cannabis flowers;

inserting the said compressing members of said compressor tray into the pockets of the filled filling tray; and then placing (1) said filled filling tray and (2) said compressor tray with said inserted compressing members into the said compression machine and then compressing the said ground cannabis flowers in said compression machine so that the said ground cannabis flowers in the filling tray conforms to the shape of said pockets and so that each pocket forms a cannabis pod; and then removing the trays from the compression machine and then removing the compressor tray from the filling tray and then removing the formed cannabis pods from the filling tray.

7. A method as claimed in claim 6 further comprising after said compressing step the step of drying the cannabis pods while they are in the filling tray to harden the cannabis so the cannabis pods maintain their desired shape after they are removed from the filling tray.

8. A method as claimed in claim 7 wherein the said cannabis pods are removed from the filling tray by ejecting them from the pockets of said filling tray with an ejector tray.

9. A method as claimed in claim 6 wherein said pockets of the filling tray are sized and configured to cooperate with said compressing members of said compressor tray so that when the pockets are filled with said ground cannabis flowers and the compressing step is carried out each subsequently dried cannabis pod will have the said porosity.

10. A method as claimed in claim 9 further including the step of drying said cannabis pods while they are in said filling tray so as to leave cavities in the pods which are created when the water in the pods evaporates during said drying step and wherein said cavities provide said pods with said porosity.

11. A method as claimed in claim 8 wherein said ejector tray includes a grid of ejector pins for insertion into holes provided in the bottom of each pocket of the filling tray to eject said pods from the pockets and wherein the method further includes inserting the ejector pins into the pocket holes of the filling tray to eject the pods from the filling tray.

12. A method as claimed in claim 1 further comprising adding an ingredient to the cannabis.

13. A method as claimed in claim 12 wherein the said added ingredient includes a member selected from the group consisting of concentrated oil and concentrated trichomes.

14. A method as claimed in claim 12 wherein the ingredient is added to the batch of cannabis after the said step of removing the stems, leaves and seeds.

15. A method as claimed in claim 1 wherein an inspected batch of cannabis containing crumbly flowers is hydrated with water so that it has a relative humidity (RH) greater than or equal to 60% but less than 80%.

16. A method as claimed in claim 1 wherein the cannabis contains sacks of resin and wherein during the mechanical compressing step the resin is released from the sacks so that the resin can act as an adhesive to help maintain the compressed cannabis pods' desired shape.

17. A method as claimed in claim 1 wherein the pod has a shape for being smoked in a complementary shaped bowl of a smoking device.

18. A method as claimed in claim 1 wherein said step of mechanically compressing a said cannabis batch is carried out without generating enough heat to cause lignins in said cannabis to flow and act as a natural glue binding the compressed said cannabis when said lignins cool and solidify.

19. A smokable cannabis pod having a desired shape consisting essentially of ground cannabis, said pod being made by a method wherein said ground cannabis is inspected to determine whether the ground cannabis is moist enough, that is, contains sufficient water, to provide it with a relative humidity (RH) greater than or equal to 60% but less than 80% and wherein said pod is provided with said desired shape by mechanically compressing and drying said moist enough cannabis and wherein said compressing and drying steps further provide said pod with a porosity which allows air to flow through the pod so that the pod burns evenly across and through the pod when it is smoked in the bowl of a smoking device.

20. A smokable cannabis pod as claimed in claim 19 wherein the step of mechanically compressing is carried out with a compression system including forming trays and a compression machine and wherein the forming trays include a filling tray configured with a grid of pockets for receiving the moist enough cannabis and wherein said pockets are shaped to provide the cannabis pods with said desired shape and wherein the forming trays further include a compressor tray configured with a grid of compressing members which are configured to be inserted into the filling tray's pockets after the pockets are filled with moist enough cannabis and wherein said method further includes:

filling the pockets of the filling tray with said moist enough cannabis;

inserting the compressing members of the compressor tray into the pockets of the filled filling tray; and then placing (1) said filled filling tray and (2) said compressor tray with said inserted compressing members into the said compression machine and then compressing the said moist enough cannabis in said compression machine so that the said moist enough cannabis in the filling tray conforms to the shape of said pockets and so that each pocket forms a cannabis pod; and then removing the trays from the compression machine and then removing the compressor tray from the filling tray and drying said moist enough cannabis pods while they are in the pockets of the filling tray so as to leave cavities in the pods which are created when the water in the pods evaporates during the drying process and wherein said cavities provide the dried cannabis pods with said even burning porosity as it is smoked in the bowl of a smoking device and then removing the dried cannabis pods from the filling tray.

21. A method of making a smokable cannabis pod having a desired shape comprising the steps of:

providing a batch of cannabis containing cannabis flowers, stems, leaves and seeds;

grinding the cannabis to detach cannabis flowers from the stems, leaves and seeds;

removing the stems, leaves and seeds from the detached ground cannabis flowers;

after removing the stems, leaves and seeds, inspecting the cannabis batch containing the detached ground cannabis flowers to determine whether the flowers are moist enough, that is contain sufficient water, to be capable of being mechanically compressed without falling apart;

providing a compression system including forming trays and wherein said forming trays include a filling tray configured with a grid of pockets each of which is shaped to provide a smokable cannabis pod with a desired shape;

filling the pockets of said filling tray with moist enough ground cannabis flowers from said batch;

mechanically compressing the said moist enough ground cannabis flowers filling the pockets of said filling tray with said compression system to form a plurality of compressed cannabis pods having the desired shape for being smoked in the bowl of a smoking device and a porosity which allows air to flow through each pod when each pod is subsequently dried so that each pod burns evenly across and through the pod when it is smoked in the bowl of the smoking device; and, drying the compressed cannabis pods while said pods are in the pockets of said filling tray to harden the pods so that the pods maintain the desired shape and so that cavities in the pods are created when the water in the pods evaporates during said drying step and wherein said cavities provide the dried pods with said porosity.

* * * * *